June 26, 1956  R. B. COSTELLO  2,752,468
APPARATUS FOR FIELD WELDING SEAMS IN HORIZONTAL PLATE
Filed Feb. 16, 1954  2 Sheets-Sheet 1
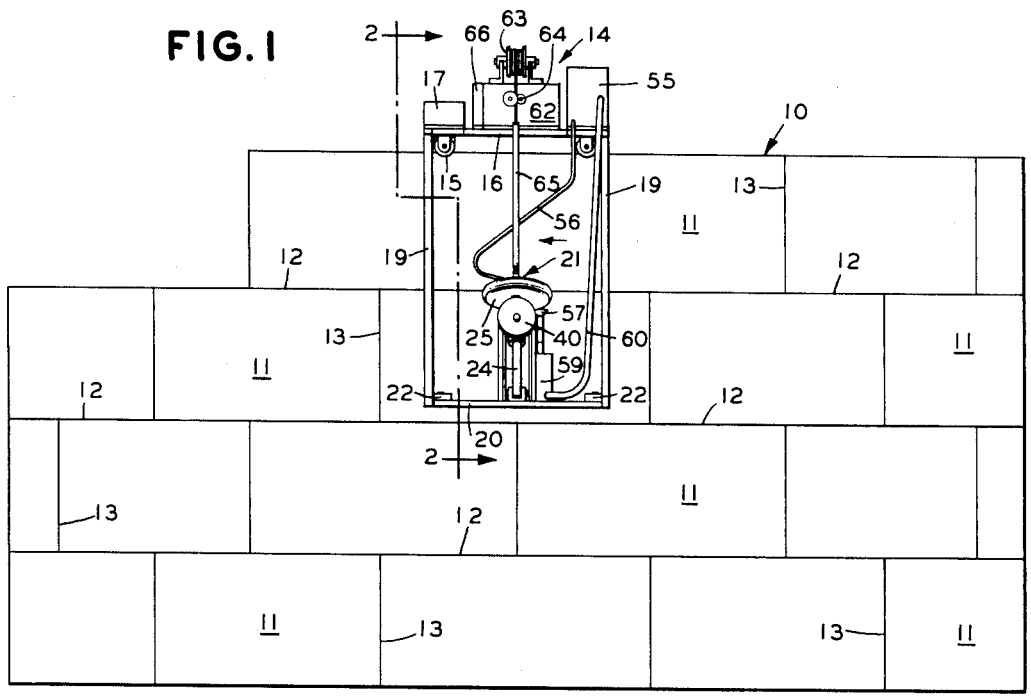
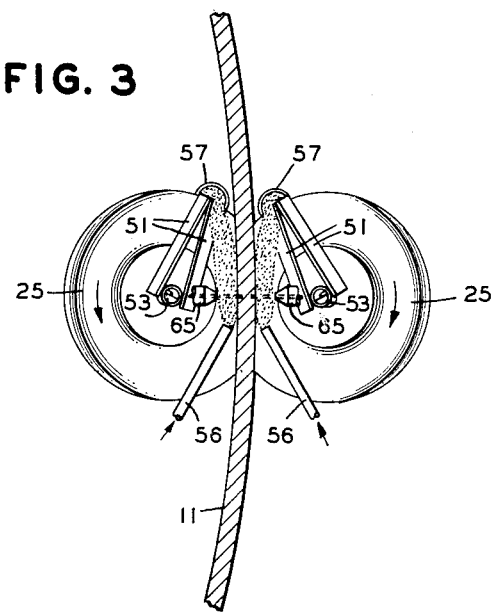
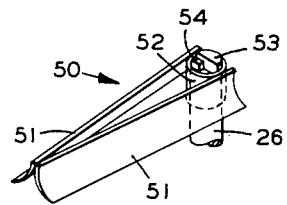
INVENTOR.
ROBERT B. COSTELLO
BY
G. H. Palmer
V. J. Darrico
ATTORNEYS

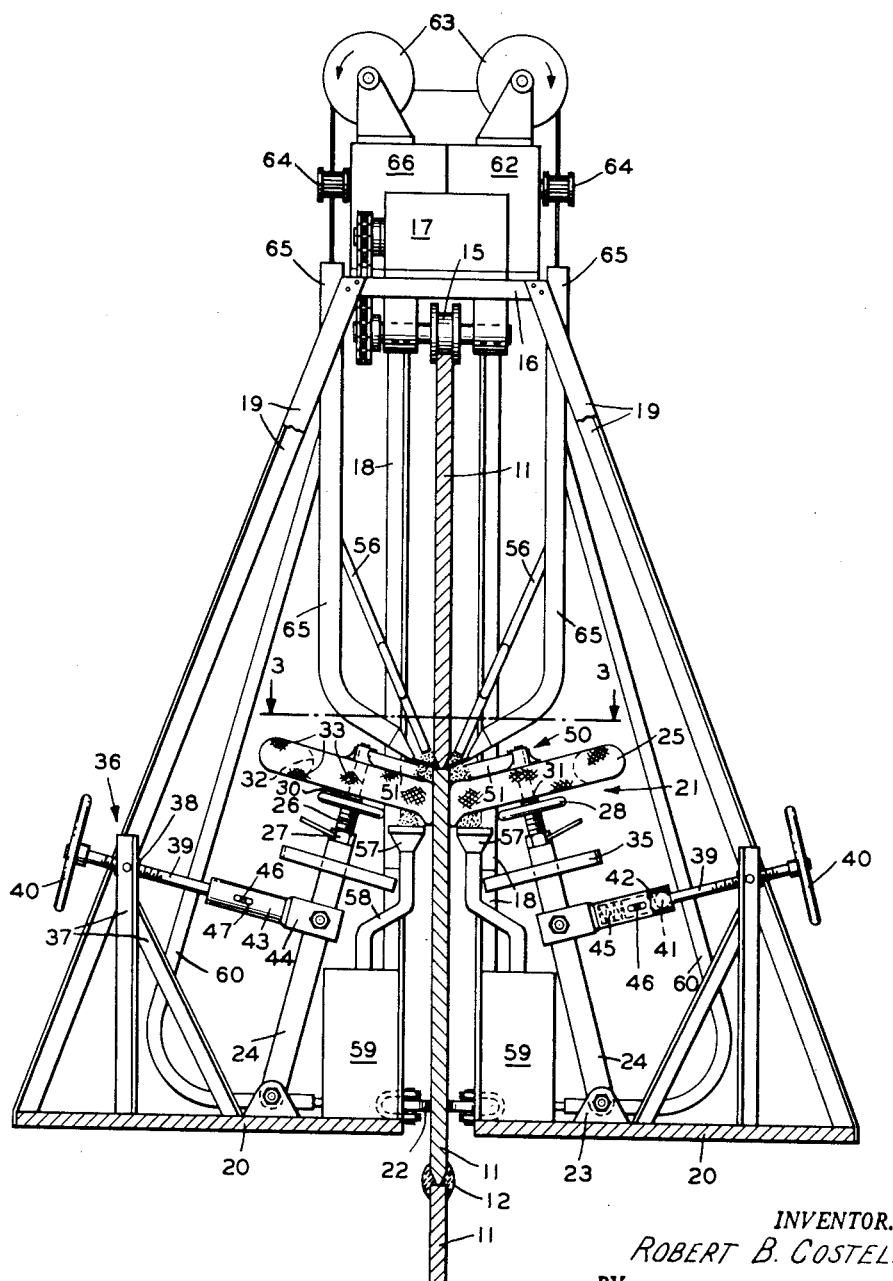

United States Patent Office 2,752,468
Patented June 26, 1956

2,752,468

APPARATUS FOR FIELD WELDING SEAMS IN HORIZONTAL PLATE

Robert B. Costello, Rahway, N. J., assignor to The M. W. Kellogg Company, Jersey City, N. J., a corporation of Delaware Application February 16, 1954, Serial No. 410,570

7 Claims. (Cl. 219—8)

This invention relates to field welding of tank shells formed of plates joined together by continuous seam welds and more particularly to simple, practical apparatus for automatically welding the horizontal seams of such tanks by flux submerged arc welding.

The advantages which follow the use of automatic flux submerged arc welding in place of hand welding with coated electrodes in the field welding of tanks were appreciated soon after the flux submerged arc welding techniques became available. For successful use of the flux submerged arc welding techniques, it is essential that a proper bed of flux be provided at the seam to be welded and such flux bed be maintained substantially immovable relative to the seam during the actual welding and for a period thereafter at least sufficient for solidification of the weld metal. To accomplish this end it was at first proposed to provide a metal shelf tack welded or otherwise united to the vertical plates of the tank and positioned below the horizontal seam to be welded as required to provide the necessary flux bed. This expedient was successful from an operational standpoint but was not a complete solution of the problem primarily because of the expense involved. The flux holding fixed metal shelf proposal has been superseded by a proposal in which an endless belt is employed for supporting the flux. It is intended that the endless belt bear snugly against the tank plate below the seam being welded so as to provide a continuous support for the flux during deposition and solidification of the weld metal. The endless belt is mounted on a carriage which is moved relative to the plate at a rate equal to the rate of traverse of the welding wire. Thus, there is no movement of the supported flux relative to the plate during deposition and solidification of the weld metal. This proposal while generally adequate in welding both sides of horizontal seams in flat plate and the outside of the horizontal seams in curved plate cannot be used with predictable results in welding the inside of the horizontal seams of curved plate. This follows from the fact that the endless belt moves between two fixed supports so that the edge of the belt is the chord of the arc of the concave surface of the tank covered by it. Hence, the central portion of the endless belt is always spaced from the concave plate surface and the granular flux cannot be supported in position as required. Various expedients have been proposed for moving the middle portion of the endless belt into contact with the concave plate surface. Such expedients are not especially successful as they cannot make the belt conform exactly and for the full contact length thereof to the concave surface of the plate nor are they sufficiently versatile to adjust the endless belt to the usual irregularities in curvature and surface condition of the tank plates.

I have found a simple and effective way of completely solving the problem so that both sides of the horizontal seams in a curved tank shell may be welded without any difficulty and without employing complicated and expensive apparatus or special preparation of the plates defining the seam.

In accordance with my invention I provide a flux supporting structure which is deformable and readily adjusts its contour to complement the contour of the tank plate so that either side of the horizontal seams in curved plate may be welded with complete assurance that a proper flux bed will at all times be maintained.

It is a principal object of this invention to provide simple rugged and inexpensive apparatus useful in the automatic flux submerged arc welding of the horizontal seams of tanks which provides a proper and unfailing flux bed on either or both sides of the horizontal seam regardless of the curvature and the surface condition of the tank plates.

It is a further principal object of this invention to provide a simple and efficient apparatus useful in the automatic flux submerged arc welding of the horizontal seams of tanks which includes a wheel adapted to snugly engage the tank plate and mounted to move along the seam as the welding progresses while rotating at a rate to maintain the peripheral portions thereof in engagement with the tank plate immovable relative thereto, the wheel including a deformable peripheral section capable of adjusting its contour to complement the contour of the tank plate engaged thereby to the end that a proper flux blanket is provided during the deposition and solidification of the weld metal of the seam.

The further features and advantages of the invention will become apparent from a consideration of the following detailed description of a present preferred embodiment thereof taken with the accompanying drawings in which:

Fig. 1 is an elevational view of a tank under construction, showing the novel welding apparatus in operating position thereon;

Fig. 2 is a sectional view taken on line 2—2 of Fig. 1 and showing details of the novel apparatus and particularly the flux positioning arrangement;

Fig. 3 is a sectional view taken on line 3—3 of Fig. 2; and

Fig. 4 is an enlarged detailed perspective showing the flux deflecting unit.

Flux submerged arc welding is employed in connection with this invention. This mode of welding is particularly suited for the field welding of large tanks such as the raw material, intermediate product and final product and final product storage tanks found in the tank farms of petroleum refineries, as it provides for the rapid deposit of high quality weld metal at a cost much lower than possible with hand welding. Flux submerged arc welding involves the supplying of a bare metal welding electrode in the form of an endless wire, for fusion in an arc at a rate controlled to substantially maintain an electric current discharge of predetermined voltage and amperage while the arc end of the electrode is maintained submerged beneath a deep blanket of granular flux. The flux blanket is maintained of a depth and length sufficient to protect the weld metal during the fusion and solidification thereof. Flux submerged arc welding will not be described in greater detail herein as it is so well known in the art as to be considered conventional. The specific apparatus elements for flux submerged arc welding shown in the several figures of the drawing for supplying and feeding the wire electrode, for supplying and controlling the welding current, and for supplying the flux, form no part of the present invention. Such specific apparatus elements are well known in the art and will not be described in detail herein.

The novel apparatus is shown arranged to simultaneously deposit metal on both sides of a horizontal joint. This mode of operation is at present preferred as it is cheaper and more efficient, since a single traverse of the apparatus along the joint is required to weld both sides of the joint, nevertheless it is within the scope of this invention to modify the apparatus so that only one side of the joint is welded at one time. As shown, the two electrode discharge ends are substantially in the same plane transverse to the line of arc traverse; this is illustrative only, since the arcs may be longitudinally spaced as required or preferred in the chosen mode of operation.

The novel apparatus is shown as mounted on the top edge of the top tier of plates 11 of the tank 10. The tank 10 is made up of a plurality of superimposed tiers of plates 11, the adjacent plates 11 being joined together by the horizontal welds 12 and the vertical welds 13. As is common in connection with the field welding of large tanks, such as the raw material, intermediate product and final product storage tanks of the tank farms of petroleum refineries, flat plates are brought to the site and in the assembling are rigged in position by well known arrangements to the curvature required. The vertical and horizontal seams of the assembled plates are welded to complete the tank structure.

The apparatus of the invention employs flux submerged arc welding and is particularly concerned with the welding of the horizontal seams 12. As shown in Fig. 1, the novel apparatus assembly 14 is mounted on the top edge of the last positioned tier of plates 11 and is moved therealong to affect the welding operation through one or more drive wheels 15 which are supported from the platform 16 and rest on said top edge. The wheel or wheels 15 are driven at a controlled rate in a manner well known in the art by a drive motor which for the purposes of this disclosure will be considered located within the casing 17 mounted on the platform 16. Suitable readily accessible means, not shown, are provided for controlling the speed of this drive motor. Structural members 18 and 19 are united to the platform 16 and depend therefrom on each side of the plates 11. To the lower ends of members 18 and 19 are attached the support platforms 20 upon which the flux positioning arrangements 21 are mounted. A plurality of spacing wheels 22 are attached to the platforms 20 and bear against the plates 11 to maintain a predetermined spacing. Since the apparatus elements, and the arrangement thereof, on each side of the plates 11 are identical, the description of one set of said elements and the arrangement thereof will be sufficient.

A lug member 23 to which is pivoted the lower end of the support member 24 is united, as by welding, to the support platform 20. The support member 24 carries the flux positioning wheel 25. The upper end of the support member 24 is hollow and tapped to accommodate the threaded lower end of the shaft, or rod 26. The lock nut 27 is provided for purposes of locking the rod 26 in any position of adjustment with relation to the support member 24. The lock nut 27 conveniently has a handle united thereto for easy manipulation thereof. Carried at the upper end of the threaded portion of the rod 26 is a hand wheel 28 whose central hub is pinned or otherwise fastened to the rod 26 so that by rotating the hand wheel 28 the effective length of the rod 26 may be increased or diminished. The upper end face of the hub of the hand wheel 28 is adapted to contact the face of a washer or similar member 30, which separates said hand wheel hub from the hub 31 of the flux positioning wheel 25 so that the hub 31 and wheel 25 may rotate on the upper unthreaded end of the rod 26 with a minimum of resistance. The wheel 25 includes an outer rim which can conveniently be made as an inflatable rubber tire 32, the inflation of which may be controlled to give it the necessary deformability and yet provide it with the required resistance. The rubber tire 32 is conveniently covered with a casing 33 of heat resisting material, as for instance, a casing 33 formed of asbestos cloth.

A U-shaped support bracket 35 is attached to the structural member 18 and limits the outward pivotal movement of the support member 24 and the wheel 25. A resilient pressure applying arrangement 36 is provided so that the flux positioning wheel 25 may be made to resiliently bear upon the surface of the plate 11 with sufficient pressure to closely adhere thereto and follow the contour thereof regardless of irregularities therein. The pressure applying arrangement 36 includes a support 37 formed of structural members united to the platform 20. A nut 38 is pivotally carried at the upper end of the support 37 and accommodates the threaded portion of the rod 39. The hand wheel 40 is fastened to the threaded outer end of the rod 39 so that by rotating the hand wheel 40 the rod 39 may be screwed in or out relative to the nut 38 and the support 37. The inner unthreaded end of the rod 39 terminates in the ball 41 which is housed in a suitably shaped socket at the end of the plug member 42. The plug member 42 is positioned in the axial bore of the positioning rod 43 which includes integral therewith the sleeve 44 which encircles and is pivotally united to the support member 24. A spring 45 is positioned between the inner end of the plug member 42 and the end of the axial bore in the positioning rod 43. The plug member 42 carries a pin 46 which moves in the slot 47 in the positioning rod 43. The spring 45 constantly urges the support member 24 and the flux positioning wheel 25 towards the plate 11 and provides a resilient connection between the plate 11 and the wheel 25 so that when any irregularity in the contour of the surface of the plate 11 is encountered the wheel 25 will remain in contact with the plate 11 without substantial increase or diminution of the pressure exerted on the plate 11. In practice the hand wheel 40 is manipulated as required to move the flux positioning wheel 25 into contact with the plate 11 and to apply sufficient pressure to deform the rim of said wheel 25 to such an extent that there is provided a zone of uninterrupted contact between the plate 11 and said rim of at least a length sufficient to maintain a flux blanket thereon immovable relative to the plate 11 during the deposition and solidification of any one increment of the weld metal at the chosen rate of arc traverse along the seam 12.

For proper removal of the flux from the flux positioning wheel 25 a flux deflecting arrangement 50 is provided. The flux deflecting arrangement 50 includes a pair of flux deflectors 51 which as shown have a plow-like cross section. The deflectors 51 point in opposite directions so that one will serve as the deflector when the wheel 25 is rotated in one direction and the other will serve as the deflector when the wheel 25 is rotated in the opposite direction. The flux deflectors 51 are united to each other and to a sleeve 52 which encircles the upper unthreaded end of the rod 26 and is rotatable thereon. To limit the rotation of the sleeve 52 as required to permit the proper one of the deflectors 51 to present itself to the flux at the proper flux discharge position, a portion of the upper end of the rod 26 is milled away to provide the abutment 53 for the stop 54 which is attached to the sleeve 52.

It will be considered for the purpose of this disclosure that platform 16 carries all of the apparatus elements necessary for the supplying the welding flux and the welding wires and for the supplying and controlling of the welding current. The welding flux is stored in the container 55 and is supplied at the proper rate to each of the wheels 25 through the flux tubes 56. The flux when removed from the wheels 55 by the flux deflectors 51 falls into the respective hoppers 57 and passes from thence through the tubing 58 to the flux tanks 59. The container 55 includes a conventional arrangement for sucking the flux from the flux tanks 59 through the tubing 60 for return to said container 55 for reuse.

The welding head, current supply connections, and the like for welding on the right-hand side of the plate 11 will be considered as housed in the container 62. The welding wire passes from the reel 63 mounted on the container 62, and is driven by the feed wheels 64 through the electrode nozzle 65 to the arc in the seam 12 and below the surface of the flux blanket supported on the wheel 25. An arc discharge of the predetermined voltage and amperage is maintained by setting the usual controls, not shown. As is usual with conventional welding heads, the rate of feed of the welding wire may be controlled within rather wide limits. The welding head for welding on the other side of the seam 12 will be considered as housed in container 66. This welding head and associated elements are the same as those for the right-hand side above described. The rate at which the electrode wires are fed is related to the rate of movement of the platform 16 along the edge of the plates 11 and the two rates are adjusted as required to obtain the desired results.

As the platform 14 moves along plates 11 and the welding progresses, the wheels 25 will rotate freely on their respective supporting rods 26 thereby constantly presenting new portions to contact with the plate 11 while removing other portions from contact with the plate 11. The flux deposited on the wheels 25 remains stationary relative to the plate 11 from the time it is deposited until it is removed through the action of the deflectors 51. No movement of flux relative to the weld metal is possible during the deposition and solidification of the weld metal. In practical operations with production equipment it was found that a zone of contact between the wheels 25 and the plate 11 of about 8 inches in length provides a proper flux support over a wide variation of traverse rates and electrode feed rates.

While the invention has been described with particular reference to a specific embodiment, it is to be understood that it is not to be limited thereto, but is to be construed broadly and restricted solely by the scope of the appended claims.

I claim:

1. In apparatus for electric arc welding horizontal seams between superimposed upstanding elements, the combination comprising a support movable relatively along a horizontal seam between superimposed upstanding elements, means movable with said support and adapted to supply a welding electrode for discharge of electric current of predetermined characteristics at said seam, an endless deformable member carried by said support and positionable against the surface of the lower one of said elements adjacent said seam, means mounting said endless member for gyratory movement about a substantially vertically disposed axis to carry the peripheral portion of said endless member through a substantially horizontally disposed circular path, means for positioning said endless member against said surface and below said seam and for resiliently applying pressure to said endless member to deform a continuous length of said peripheral portion out of said circular path into a path complementing said surface in contact therewith and to provide an uninterrupted zone of intimate contact between said surface and said endless member, sections of said peripheral portion continuously entering said path complementing said surface at one end thereof and sections of said peripheral portions continuously leaving said path complementing said surface at the other end thereof as said support means move along said horizontal seams, and means for depositing granular flux on said zone to cover said seam for the extent of said zone.

2. In apparatus for electric arc welding horizontal seams between superimposed upstanding elements, the combination comprising a support movable relatively along a horizontal seam between superimposed upstanding elements, means movable with said support and adapted to supply a welding electrode for discharge of electric current of predetermined characteristics at said seam, a wheel having a deformable rim carried by said support and positionable against the surface of the lower one of said elements adajacent said seam, means for positioning said wheel against said surface and below said seam and for resiliently applying pressure thereto to deform a continuous length of said rim and to provide an uninterrupted zone of intimate contact between said surface and said rim, means mounting said wheel for movement of said deformed length of said rim with said surface during the relative movement of said support and said elements, and means for depositing granular flux on said zone to cover said seam for the extent of said zone.

3. In apparatus for electric arc welding horizontal seams between superimposed upstanding elements, the combination comprising a support movable relatively along a horizontal seam between superimposed upstanding elements, means movable with said support and adapted to supply a welding electrode for discharge of electric current of predetermined characteristics at said seam, a standard member having one end pivotally mounted on said support and swingable in a plane transverse to the line of movement of said support, a wheel mounted for rotation on the other end of said standard member, and means connected to said standard member for swinging said standard member to carry said wheel into and out of engagement with the surface of the one of said elements below said seam, said wheel including a deformable rim, said connected means including means for applying pressure sufficient to deform a continuous length of said rim against said surface to provide a flux supporting platform below said seam.

4. In apparatus for electric arc welding horizontal seams between superimposed upstanding elements, the combination comprising a support movable relatively along a horizontal seam between superimposed upstanding elements, means movable with said support and adapted to supply a welding electrode for discharge of electric current of predetermined characteristics at said seam, a standard member of adjustable length having one end pivotally mounted on said support and swingable in a plane transverse to the line of movement of said support, a wheel mounted for rotation on the other end of said standard member, means for swinging said standard member to carry said wheel into and out of engagement with the surface of the one of said elements below said seam, said wheel including a deformable rim, said connected means including means for applying pressure sufficient to deform a continuous length of said rim against said surface to provide a flux supporting platform below said seam, and resilient means connecting said standard swinging means to said standard.

5. In apparatus for electric arc welding horizontal seams between superimposed upstanding elements, the combination comprising a support movable relatively along a horizontal seam between superimposed upstanding elements, means movable with said support and adapted to supply a welding electrode for discharge of electric current of predetermined characteristics at said seam, a standard member of adjustable length having one end pivotally mounted on said support and swingable in a plane transverse to the line of movement of said support, a wheel mounted for rotation on the other end of said standard member, means for swinging said standard member to carry said wheel into and out of engagement with the surface of said elements below said seam, said wheel including an inflatable rim formed of resilient material, a heat resistant covering on said inflatable rim, said connected means including means for applying pressure sufficient to deform a continuous length of said rim against said surface to provide a flux supporting platform below said seam, and resilient means connecting said standard swinging means to said standard.

6. In apparatus for electric arc welding horizontal seams between superimposed upstanding elements, the combination comprising a support movable relatively along a horizontal seam between superimposed upstanding elements, means movable with said support and adapted to supply a welding electrode for discharge of electric current of predetermined characteristics at said seam, a wheel having a deformable rim carried by said support and positionable against the surface of the lower one of said elements adjacent said seam, means for positioning said wheel member against said surface and below said seam and for applying pressure thereto to deform a continuous length of said rim and to provide an uninterrupted zone of intimate contact between said surface and said rim, means mounting said wheel for movement with said surface during the relative movement of said support and said elements, means for depositing granular flux on said zone adjacent the end thereof of initial contact between said wheel and said surface, and opposed flux deflecting members on said wheel adapted to deflect the flux from said wheel at the other end of said zone, said opposed members mounted for swinging movement from one to another of two flux deflecting positions, said opposed members in one of said positions adapted to deflect the flux from said wheel in one direction of relative movement of said platform and in the other of said positions adapted to deflect flux from said wheel in the other direction of relative movement of said platform.

7. In apparatus for electric arc welding horizontal seams between superimposed upstanding elements, the combination comprising a support movable relatively along a horizontal seam between superimposed upstanding elements, means movable with said support and adapted to supply a welding electrode for discharge of electric current of predetermined characteristics at said seam, a standard member having one end pivotally mounted on said support and swingable in a plane transverse to the line of movement of said support, a wheel including a deformable rim and mounted for rotation on the other end of said standard member, means for swinging said standard member to carry said wheel into and out of engagement with the surface of said elements below said seam and for applying pressure sufficient to deform a continuous length of said rim against said surface to provide a flux supporting platform below said seam, means for depositing granular flux on said flux supporting platform adjacent the end thereof of initial contact between said rim and said surface, a sleeve mounted for rotation on the other end of said standard member and above said wheel, a pair of opposed plow-like flux deflecting members having corresponding end portions united to said sleeve for movement therewith, and a stop element united to the internal surface of said sleeve, said other end of said standard having a section thereof removed to provide a path for movement of said stop element, the portions of said other end at the ends of said path acting as limit stops for the movement of said stop element and said sleeve whereby said deflector elements are held at the other end of said flux supporting platform in either direction of relative movement of said support.

References Cited in the file of this patent
UNITED STATES PATENTS

| | | |
|---|---|---|
| 2,529,812 | Peters | Nov. 14, 1950 |
| 2,638,524 | Meyer | May 12, 1953 |
| 2,678,987 | Talley | May 18, 1954 |
| 2,698,891 | Meyer | Jan. 4, 1955 |